US011967907B2

(12) United States Patent
Shi et al.

(10) Patent No.: US 11,967,907 B2
(45) Date of Patent: Apr. 23, 2024

(54) SPACE VECTOR PULSE WIDTH MODULATION METHOD FOR ANY LEVEL CASCADED H-BRIDGE INVERTER

(71) Applicant: ZHEJIANG UNIVERSITY, Zhejiang (CN)

(72) Inventors: Tingna Shi, Zhejiang (CN); Huan Yao, Zhejiang (CN); Yan Yan, Zhejiang (CN); Guozheng Zhang, Zhejiang (CN); Zhiqiang Wang, Zhejiang (CN); Changliang Xia, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 301 days.

(21) Appl. No.: 17/607,404

(22) PCT Filed: May 22, 2020

(86) PCT No.: PCT/CN2020/091726
§ 371 (c)(1),
(2) Date: Oct. 29, 2021

(87) PCT Pub. No.: WO2021/036364
PCT Pub. Date: Mar. 4, 2021

(65) Prior Publication Data
US 2022/0224249 A1 Jul. 14, 2022

(30) Foreign Application Priority Data
Aug. 26, 2019 (CN) .......................... 201910789974.5

(51) Int. Cl.
*H02M 7/483* (2007.01)
*H02M 1/00* (2006.01)
(52) U.S. Cl.
CPC ......... *H02M 7/4835* (2021.05); *H02M 1/007* (2021.05); *H02M 7/483* (2013.01)

(58) Field of Classification Search
CPC ..... H02M 7/4835; H02M 7/483; H02M 1/007
See application file for complete search history.

(56) References Cited

U.S. PATENT DOCUMENTS 7,558,089 B2 * 7/2009 Mese .................... H02M 7/487
363/52
10,574,154 B1 * 2/2020 Qiao ................. H02M 7/53871
(Continued)

FOREIGN PATENT DOCUMENTS

| CN | 1487658 | 4/2004 |
| CN | 104578867 | 4/2015 |

(Continued)

OTHER PUBLICATIONS

"International Search Report (Form PCT/ISA/210) of PCT/CN2020/091726", dated Aug. 24, 2020, with English translation thereof, pp. 1-5.

*Primary Examiner* — Alex Torres-Rivera
(74) *Attorney, Agent, or Firm* — JCIP GLOBAL INC.

(57) ABSTRACT

The invention proposed a space vector pulse width modulation (SVPWM) method for any level cascaded H-bridge inverter. The multilevel space vector diagram is re-divided, and the coordinates of the nearest three vectors (NTVs) are directly obtained by judging the position of the reference vector. The duty cycles of the NTVs is calculated through additional vector which is equivalent to the reference vector. Then, the switching states are obtained by zero-sequence component and coordinate transformation, and the desired reference vector is synthesized for the SVPWM modulation. The invention realizes multilevel modulation in Cartesian coordinates without any iterative calculation, and the calculation is independent of the level number. Furthermore, the locating of the reference vector and the calculation of the duty cycles are simplified, and the calculation complexity is reduced.

5 Claims, 3 Drawing Sheets

(56) References Cited

U.S. PATENT DOCUMENTS

2007/0139970 A1  6/2007 Mese et al.
2016/0099661 A1  4/2016 Duan et al.
2021/0021208 A1* 1/2021 Wang ................ H02M 7/53875

FOREIGN PATENT DOCUMENTS

CN    104753381    7/2015
CN    110518822    11/2019
WO    2015138744   9/2015

* cited by examiner

and universal SVPWM method applicable to the any level cascaded H-bridge inverter. The invention first determines the position of the reference vector, and then selects the three voltage vectors closest to the reference vector, namely the NTVs coordinates. Then the duty cycles of the NTVs are calculated, and the desired reference vector is synthetized by using the switching states. Thus, the space vector pulse width modulation is realized.

SPACE VECTOR PULSE WIDTH MODULATION METHOD FOR ANY LEVEL CASCADED H-BRIDGE INVERTER

CROSS-REFERENCE TO RELATED APPLICATION

This application is a 371 of international application of PCT application serial no. PCT/CN2020/091726, filed on May 22, 2020, which claims the priority benefit of China application no. 201910789974.5, filed on Aug. 26, 2019. The entirety of each of the above mentioned patent applications is hereby incorporated by reference herein and made a part of this specification.

TECHNICAL FIELD

The invention relates to a modulation method of cascaded H-bridge inverter belonging to the field of power electronic control, in particular to a space vector pulse width modulation (SVPWM) method for any level cascaded H-bridge inverter. It is suitable for cascaded H-bridge inverter in motor drive, renewable energy generation and other fields.

DESCRIPTION OF RELATED ART

With the development of power electronics in the medium and high voltage and high power applications, the traditional two-level inverter has been difficult to apply. Therefore, the multilevel inverters are receiving more and more attention and research in the field of medium and high power applications. Among them, cascaded H-bridge inverter has the following characteristics: modularization, less power devices, no need to balance the capacitor voltage on DC side, and easy to expand the number of levels, which makes the inverter widely used in industrial occasions. The widely employed modulation methods for multilevel inverters are carrier-based sinusoidal pulse width modulation (SPWM), nearest-level modulation (NLM), selective harmonic elimination modulation (SHE) and space vector pulse width modulation (SVPWM). Among these strategies, SVPWM method is a promising modulation strategy because it has more flexibility and freedom, and is easy to be digitized. However, with the increase of the number of levels, it is very complex to determine the position of the reference vector in space vector diagram, which makes it difficult to obtain the coordinates of the nearest three vectors (NTVs). In addition, the duty cycles calculation of the NTVs will become more complicated. In this case, the traditional modulation methods in two-level or three-level inverter can't be used.

According to the different coordinate systems, the most common multilevel SVPWM methods can be divided into three categories. The first one is based on abc coordinate system, which is less used. The second one is based on 60 degrees coordinate system, which usually requires additional coordinate transformation. The third one is based on the αβ coordinate system, but the implementation processes of the existing methods are often complex. Some methods depend on the number of levels when determining the position of the reference vector, which requires iterative operation. When the number of levels increases, the amount of calculation will also increase. Other methods need sector judgment and complex trigonometric function operation, which increases the computational complexity.

SUMMARY

In order to solve the problems mentioned in the background technology, the invention provides a simple, feasible and universal SVPWM method applicable to the any level cascaded H-bridge inverter. The invention first determines the position of the reference vector, and then selects the three voltage vectors closest to the reference vector, namely the NTVs coordinates. Then the duty cycles of the NTVs are calculated, and the desired reference vector is synthetized by using the switching states. Thus, the space vector pulse width modulation is realized.

The technical scheme adopted by the invention is as follows:

1) The voltage vectors generated by cascaded H-bridge inverter is used to synthesize the multilevel space vector diagram in Cartesian coordinates (αβ coordinate system), in which multiple triangles are formed by connecting the adjacent voltage vectors, and the voltage vectors on the vertices of a triangle are the nearest three vectors (NTVs). The reference vector is located in the multilevel space vector diagram; the method also includes the following steps:

2) The multilevel space vector diagram in Cartesian coordinates (αβ coordinate system as shown in FIG. 2) is divided into two types of rectangles. Then, determine what kind of rectangles the reference vector is located in:

The 4n+1 horizontal dashed lines are added at equal intervals along the direction of the horizontal axis (α-axis). The horizontal dashed lines are parallel to the direction of the α-axis, and the middle horizontal dashed line coincides with the horizontal axis (α-axis). The distance between adjacent horizontal dashed line is $\sqrt{3}/2$ times of the unit length. The 8n−1 vertical dashed lines are added at equal intervals along the direction of the vertical axis (β-axis). The vertical dashed lines are parallel to the direction of the β-axis, and the middle vertical dashed line coincides with the vertical axis (β-axis). The distance between adjacent vertical dashed line is 0.5 times of the unit length. Where, n is the number of H-bridge cells in each phase; the unit length is the distance from the origin to the coordinates (1,0) or coordinates (0,1) in Cartesian coordinates.

The multilevel space vector diagram is divided into several rectangles by horizontal dashed lines and vertical dashed lines (The right triangle on the edge is also regarded as a rectangle). In each rectangle, there are two voltage vectors at the vertex of the rectangle, and the line between these two voltage vectors forms a diagonal of the rectangle. According to the different diagonals of rectangles, rectangles are divided into two categories: The rectangle is regarded as type A rectangle when the angle between the diagonal and the α-axis is 60 degrees; the rectangle is regarded as type B rectangle when the angle between the diagonal and the α-axis is 120 degrees. Then, according to the boundary of the rectangles, it can judge that the reference vector is located in type A rectangle or type B rectangle.

3) The rectangle is further divided according to its diagonal. The area above the diagonal of the rectangle is regarded as type I area, and the area below the diagonal of the rectangle is regarded as type II area. Then, judge whether the reference vector is located in type I area or type II area. According to the type of the rectangles and the type of area, the position of reference vector can be divided into four categories: AI, AII, BI and BII. AI, AII, BI and BII represent type I area in type A rectangle, type II area in type A rectangle, type I area in type B rectangle and type II area in type B rectangle, respectively.

4) According to the position of the reference vector, the coordinates of the NTVs in Cartesian coordinates (αβ coordinate system) are obtained, and the switching states of cascaded H-bridge inverter are obtained by selecting zero-sequence components and conducting coordinate transformation.

5) The reference vector is decomposed into the active vector OP and the additional vector PS, and then the duty cycles of the NTVs are obtained when the reference vector is in different positions.

In the invention, the duty cycles of the NTVs are equivalent to the duty cycles of the additional vector PS in the corresponding triangle. Thus, the duty cycles of the NTVs are obtained.

6) The desired reference vector is synthesized by the switching states of cascaded H-bridge inverter and the duty cycles of the NTVs. Thus, the multilevel SVPWM is realized by using the synthesized reference vector.

In the step 2), after dividing the multilevel space vector diagram in Cartesian coordinates into two types of rectangles, the method to determine which type of rectangle the reference vector is located in is as follows:

First, the quantization factor $q_\alpha$ of the α-axis and quantization factor $q_\beta$ of the β-axis are calculated by the following formula:

$$\begin{cases} q_\alpha = \text{floor}(V_{ref\alpha}/0.5) \\ q_\beta = \text{floor}\left(V_{ref\beta}/\frac{\sqrt{3}}{2}\right) \end{cases} \quad (1)$$

Where, $V_{ref\alpha}$ and $V_{ref\beta}$ are the components of the horizontal axis and the vertical axis (α-axis and β-axis) of the reference vector $V_{ref}$ in Cartesian coordinates, respectively; floor(•) represents the downward rounding function.

Then, judge whether the reference vector is located in type A rectangle or type B rectangle by using the following formula:

$$k_{rec} = \begin{cases} 0, & \text{when } q_\alpha + q_\beta \text{ is even} \\ 1, & \text{when } q_\alpha + q_\beta \text{ is odd} \end{cases} \quad (2)$$

Where, $k_{rec}$ represents the judgement coefficient of rectangles in which the reference vector is located in. When $k_{rec}$ equals 0, the reference vector is in type A rectangle; when $k_{rec}$ equals 1, the reference vector is in type B rectangle.

In the step 3), the method to determine which type of area the reference vector is located in is as follows:

The reference vector $V_{ref}$ is decomposed into the synthesis of the active vector OP and additional vector PS. According to the coordinates of the additional vector PS, the additional vector PS is expressed as:

$$\begin{cases} v_{s\alpha} = V_{ref\alpha} - \frac{1}{2}(q_\alpha + k_{rec}) \\ v_{s\beta} = V_{ref\beta} - \frac{\sqrt{3}}{2}q_\beta \end{cases} \quad (3)$$

Where, $v_{s\alpha}$ and $v_{s\beta}$ are the components of the horizontal axis and the vertical axis (α-axis and β-axis) of the additional vector PS in Cartesian coordinates, respectively.

Then, judge whether the reference vector is located in type I area or type II area by using the following formula:

$$k_{reg} = (-1)^{k_{rec}} \sqrt{3} \, v_{s\alpha} - v_{s\beta} \quad (4)$$

Where, $k_{reg}$ represents the judgement coefficient of the area in which the reference vector is located in. When $k_{reg}$ is greater than 0, the reference vector is in type I area; when $k_{reg}$ is less than 0, the reference vector is in type II area; when $k_{reg}$ is equal to 0, the reference vector is at the boundary of type I area and type II area, which can be arbitrarily determined as type I area or type II area, and it has no effect on the result.

In any rectangle in the disclose, judging the area where the reference vector is located in is equivalent to judging the area of the additional vector PS, and then the area of the reference vector is obtained.

In the step 4), the coordinates of the NTVs in Cartesian coordinates (αβ coordinate system) are obtained according to the position of the reference vector according to the correspondence in the following table:

|  | $v_1$ | $v_2$ | $v_3$ |
|---|---|---|---|
| AI | $\left(\frac{1}{2}q_\alpha + 1, \frac{\sqrt{3}}{2}q_\beta\right)$ | $\left(\frac{1}{2}(q_\alpha + 1), \frac{\sqrt{3}}{2}(q_\beta + 1)\right)$ | $\left(\frac{1}{2}q_\alpha, \frac{\sqrt{3}}{2}q_\beta\right)$ |
| AII | $\left(\frac{1}{2}(q_\alpha + 1), \frac{\sqrt{3}}{2}(q_\beta + 1)\right)$ | $\left(\frac{1}{2}(q_\alpha - 1), \frac{\sqrt{3}}{2}(q_\beta + 1)\right)$ | $\left(\frac{1}{2}q_\alpha, \frac{\sqrt{3}}{2}q_\beta\right)$ |
| BI | $\left(\frac{1}{2}(q_\alpha + 1), \frac{\sqrt{3}}{2}q_\beta\right)$ | $\left(\frac{1}{2}q_\alpha, \frac{\sqrt{3}}{2}(q_\beta + 1)\right)$ | $\left(\frac{1}{2}(q_\alpha - 1), \frac{\sqrt{3}}{2}q_\beta\right)$ |
| BII | $\left(\frac{1}{2}(q_\alpha + 2), \frac{\sqrt{3}}{2}(q_\beta + 1)\right)$ | $\left(\frac{1}{2}q_\alpha, \frac{\sqrt{3}}{2}(q_\beta + 1)\right)$ | $\left(\frac{1}{2}(q_\alpha + 1), \frac{\sqrt{3}}{2}q_\beta\right)$ |

Where, $v_1$, $v_2$ and $v_3$ represent the NTVs. Specifically, they represent the first voltage vector, the second voltage vector and the third voltage vector, respectively.

In the step 5), when the reference vector is in different positions, the duty cycles of the NTVs are obtained as follow:

When the reference vector is located in AI area or BI area, the duty cycles of the NTVs are obtained by the following formula:

$$\begin{cases} d_1 = v_{s\alpha} - \dfrac{v_{s\beta}}{\sqrt{3}} + k_{rec} \\ d_2 = \dfrac{2}{\sqrt{3}} v_{s\beta} \\ d_3 = 1 - d_1 - d_2 \end{cases} \quad (5)$$

When the reference vector is located in AII area or BII area, the duty cycles of the NTVs are obtained by the following formula:

$$\begin{cases} d_1 = v_{s\alpha} + \dfrac{v_{s\beta}}{\sqrt{3}} \\ d_2 = \dfrac{v_{s\beta}}{\sqrt{3}} - v_{s\alpha} \\ d_3 = 1 - d_1 - d_2 \end{cases} \quad (6)$$

Where, $d_1$, $d_2$ and $d_3$ represent the duty cycles of $v_1$, $v_2$ and $v_3$, respectively.

The beneficial effects of the invention are as follows:

The invention of SVPWM method for any level cascaded H-bridge inverter realizes the multilevel modulation in $\alpha\beta$ coordinate system. The coordinates of the NTVs are obtained directly from the position of reference vector without any iterative calculation, and the calculation is independent of the level number.

In the invention, the reference vector is equivalent to an additional vector, and it only needs to determine the area where the additional vector is located in and calculate the duty cycles by using the additional vector in the corresponding triangle. Therefore, the calculation processes of locating the reference vector and calculating the duty cycles are simplified. In addition, the calculation of trigonometric function is not needed, and the calculation complexity is reduced.

The method of the invention can be applied to the motor drive, renewable power generation and other fields.

DESCRIPTION OF THE EMBODIMENTS

In the following part, the invention of SVPWM method for any level cascaded H-bridge inverter is described in detail with examples and attached figures.

Figure 1:
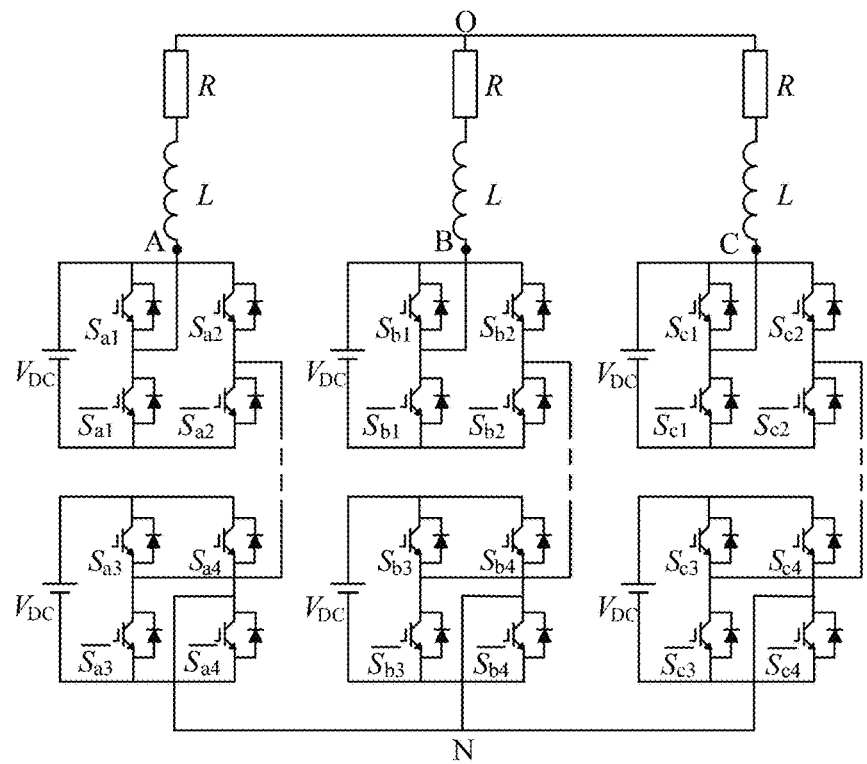
FIG. 1 shows the topology of cascaded H-bridge inverter.
Figure 2:
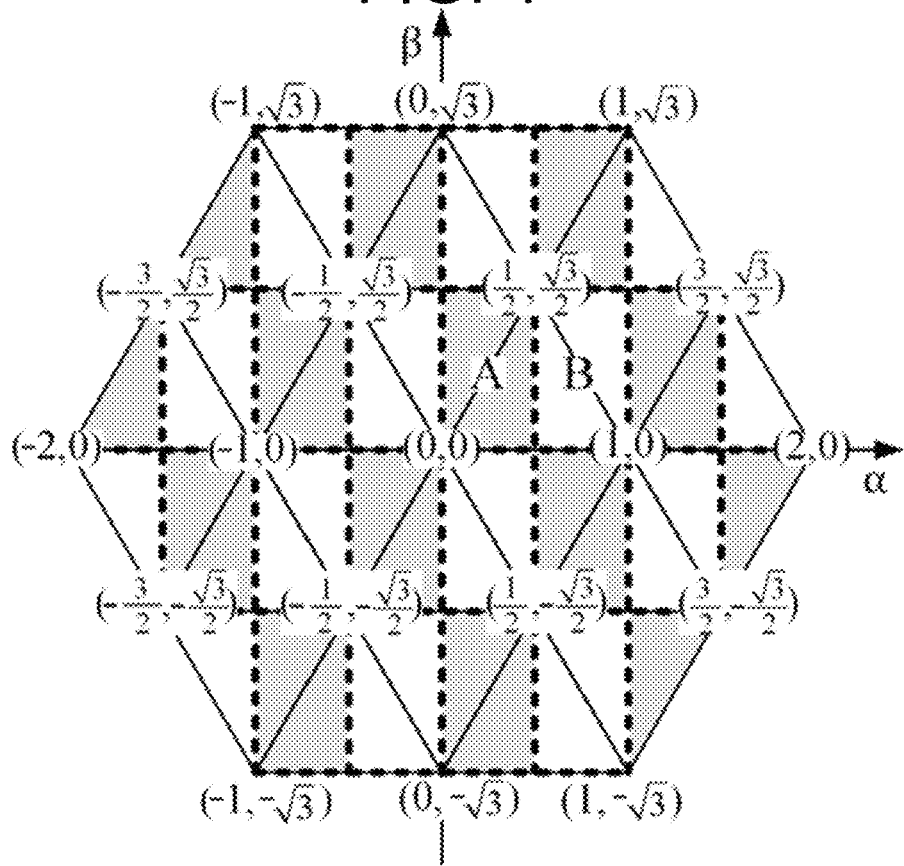
FIG. 2 shows the space vector diagram in $\alpha\beta$ coordinate system and rectangular region division.

The topology of cascaded H-bridge inverter is shown in FIG. 1. The following is an example of cascaded H-bridge inverter with only one H-bridge cell in each phase (three-level). It should be noted that the invention is applicable to any level cascaded H-bridge inverter. In this case, the three-level space vector diagram in $\alpha\beta$ coordinate system is shown in FIG. 2.

The SVPWM method of the invention includes the following steps:

The specific implementation is carried out when the cascaded H-bridge inverter can output three-level.

1) The voltage vectors generated by cascaded H-bridge inverter is used to form the multilevel space vector diagram, in which multiple triangles are formed by connecting the adjacent voltage vectors, and the voltage vectors on the vertices of a triangle are called the nearest three vectors (NTVs). The three-level space vector diagram in the form of Cartesian coordinates ($\alpha\beta$ coordinate system) is divided according to the dashed lines in FIG. 2:

The 4n+1 horizontal dashed lines are added at equal intervals along the direction of a horizontal axis ($\alpha$-axis). The horizontal dashed lines are parallel to the direction of $\alpha$-axis, and the middle horizontal dashed line coincides with the horizontal axis ($\alpha$-axis). The distance between adjacent horizontal dashed line is $\sqrt{3}/2$ times of the unit length. The 8n−1 vertical dashed lines are added at equal intervals along the direction of the vertical axis ($\beta$-axis). The vertical dashed lines are parallel to the direction of the $\beta$-axis, and the middle vertical dashed line coincides with the vertical axis ($\beta$-axis). The distance between adjacent vertical dashed line is 0.5 times of the unit length.

Where, n is the number of H-bridge cells in each phase; the unit length is the distance from the origin to the coordinates (1,0) or coordinates (0,1) in Cartesian coordinates.

The multilevel space vector diagram is divided into several rectangles by horizontal dashed lines and vertical dashed lines. In each rectangle, there are two voltage vectors at the vertex of the rectangle, and the line between these two voltage vectors forms a diagonal of the rectangle. According to the different diagonals of rectangles, rectangles are divided into two categories: The rectangle is regarded as type A rectangle when the angle between the diagonal and the $\alpha$-axis is 60 degrees; the rectangle is regarded as type B rectangle when the angle between the diagonal and the $\alpha$-axis is 120 degrees. In the FIG. 2, in order to make a distinction between the two types of rectangles, dark colors represent type A rectangles and light colors represent type B rectangles. Then, according to the boundary of the rectangles, the quantization factor $q_\alpha$ of the $\alpha$-axis and quantization factor $q_\beta$ of the vertical $\beta$-axis are calculated by the following formula:

$$\begin{cases} q_\alpha = \text{floor}(V_{ref\alpha}/0.5) \\ q_\beta = \text{floor}\left(V_{ref\beta} \Big/ \dfrac{\sqrt{3}}{2}\right) \end{cases} \quad (1)$$

Where, $V_{ref\alpha}$ and $V_{ref\beta}$ are the components of the horizontal axis and the vertical axis of the reference vector $V_{ref}$ in Cartesian coordinates, respectively; floor(•) represents the downward rounding function.

Then, judge whether the reference vector is located in type A rectangle or type B rectangle by using the judgement coefficient of rectangles in the following formula:

$$k_{rec} = \begin{cases} 0, & \text{when } q_\alpha + q_\beta \text{ is even} \\ 1, & \text{when } q_\alpha + q_\beta \text{ is odd} \end{cases} \quad (2)$$

Where, $k_{rec}$ represents the judgement coefficient of rectangles in which the reference vector is located in. The criteria are shown in Table I. When $k_{rec}$ equals 0, the reference vector is in type A rectangle; when $k_{rec}$ equals 1, the reference vector is in type B rectangle.

TABLE I

| | $k_{rec}$ | | $k_{reg}$ | |
|---|---|---|---|---|
| Condition | 0 | 1 | ≥0 | <0 |
| Position | A | B | I | II |

Figure 3:
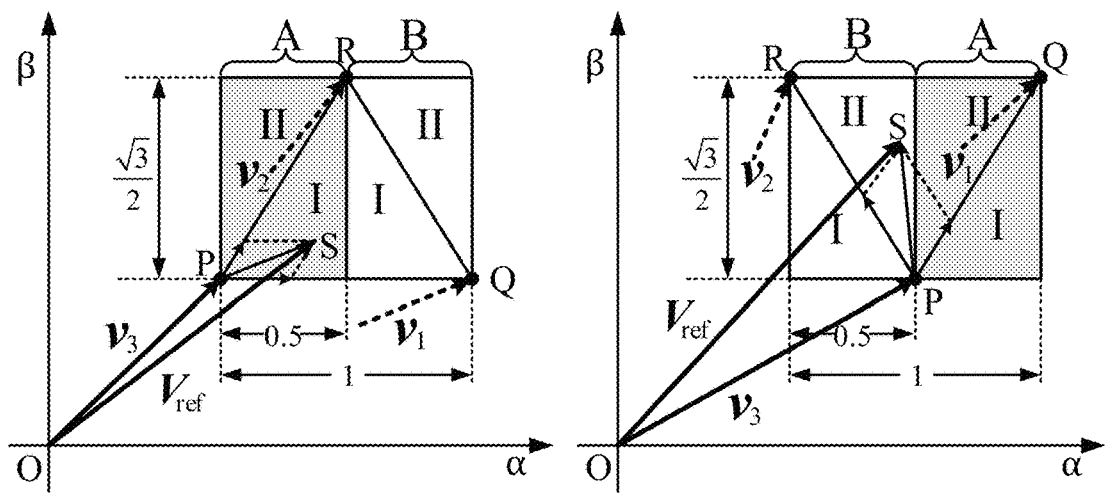
FIG. 3 shows the method of the locating the reference vector.
Figure 4A:
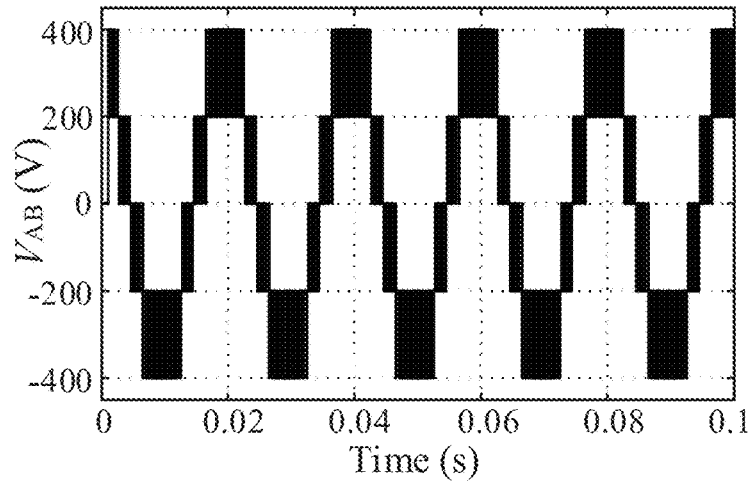
FIG. 4a shows the line voltage waveform (three-level) when each phase of the inverter has one H-bridge cell.
Figure 4B:
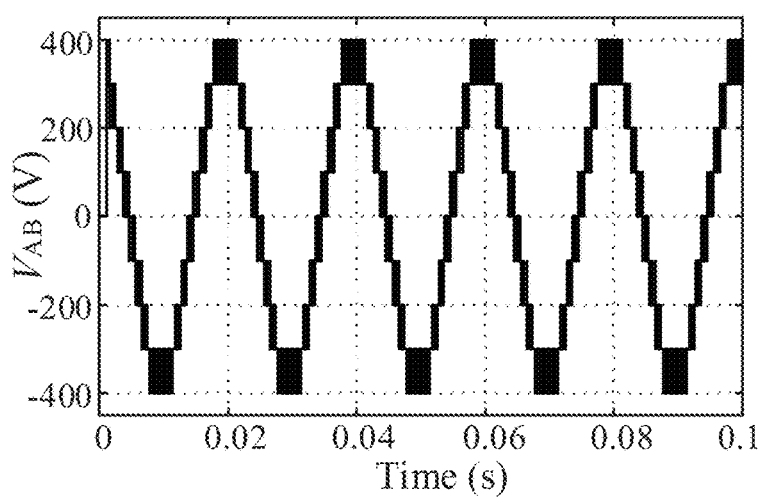
FIG. 4b shows the line voltage waveform (five-level) when each phase of the inverter has two H-bridge cells.
Figure 4C:
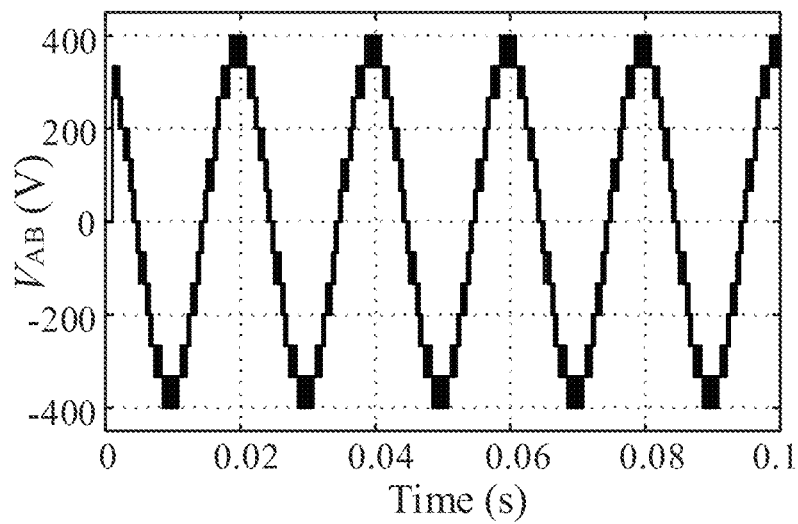
FIG. 4c shows the line voltage waveform (seven-level) when each phase of the inverter has three H-bridge cells.
Figure 4D:
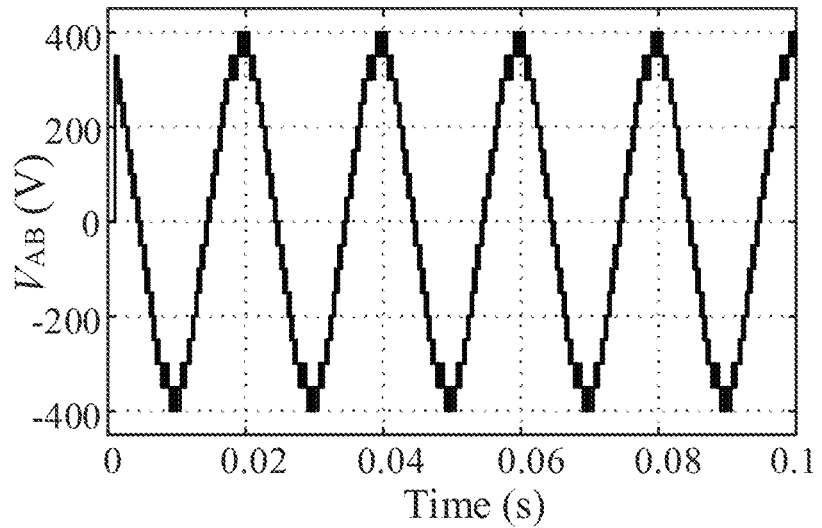
FIG. 4d shows the line voltage waveform (nine-level) when each phase of the inverter has four H-bridge cells.

2) According to the diagonal of the rectangle, the rectangle can be further divided into type I area and type II area. The area above the diagonal of the rectangle is regarded as type I area, and the area below the diagonal of the rectangle is regarded as type II area. And type I area and type II area are combined into upward triangle and downward triangle, respectively, as shown in FIG. 3. The area can be determined by the following methods.

In the two types of rectangles, $V_{ref}$ is decomposed into active vector OP and additional vector PS:

$$V_{ref} = OP + PS \quad (3)$$

Therefore, it can be seen from FIG. 3 that in any rectangle, judging the area where the reference vector is located in can be equivalent to judging the area where the additional vector PS is located in. And in any rectangle, the coordinate of its left lower vertex is expressed as $(q_\alpha/2, \sqrt{3}q_\beta/2)$. For the type A rectangle, as shown in the left figure of FIG. 3, this coordinate is the coordinate of vertex P; for the type B rectangle, as shown in the right figure of FIG. 3, the coordinate of vertex P is $((1+q_\alpha)/2, \sqrt{3}q_\beta/2)$. Therefore, according to the coordinate of vertex P, the additional vector PS is expressed as:

$$\begin{cases} v_{s\alpha} = V_{ref\alpha} - \frac{1}{2}(q_\alpha + k_{rec}) \\ v_{s\beta} = V_{ref\beta} - \frac{\sqrt{3}}{2}q_\beta \end{cases} \quad (4)$$

Where, $v_{s\alpha}$ and $v_{s\beta}$ are the components of the horizontal axis and the vertical axis ($\alpha$-axis and $\beta$-axis) of the additional vector PS in Cartesian coordinates, respectively.

For type A rectangles and type B rectangles, the coefficients are calculated respectively:

$$k_A = \sqrt{3}v_{s\alpha} - v_{s\beta} \quad (5)$$

$$k_B = -\sqrt{3}v_{s\alpha} - v_{s\beta} \quad (6)$$

Where, $k_A$ and $k_B$ represent the judgement coefficients of type I area and type II area in type A rectangle and type B rectangle, respectively. When $k_A$ or $k_B$ is greater than or less than 0, the reference vector is in type I area or type II area, respectively.

Further, the judgement coefficient of the area by integrate Eq. (5) and Eq. (6) as:

$$k_{reg} = (-1)^{k_{rec}}\sqrt{3}v_{s\alpha} - v_{s\beta} \quad (7)$$

Where, $k_{reg}$ represents the judgement coefficient of the area in which the reference vector is located in. And the criteria are shown in Table I. When $k_{reg}$ is equal to 0, the reference vector is at the boundary of type I area and type II area, which can be arbitrarily determined as type I area or type II area, and it has no effect on the result.

By dividing the space vector diagram into rectangles and according to the above determination method, the position of the reference vector can be located in type A rectangle or type B rectangle and type I area or type II area by Eq. (2) and Eq. (7). According to the above determination, the position of reference vector can be divided into four categories: AI, AII, BI and BII.

3) Taking the AI area as an example, as shown in the left figure of FIG. 3, the coordinates of vertex P is expressed as $(q_\alpha/2, \sqrt{3}q_\beta/2)$, which is the coordinates of $v_3$. Thus, the coordinates of $v_1$ and $v_2$ can be obtained according to the position of NTVs, and the NTVs of other regions can be obtained by the same procedure. On these grounds, the coordinates of NTVs in $\alpha\beta$ coordinate system are shown in Table II.

TABLE II

| | $v_1$ | $v_2$ | $v_3$ |
|---|---|---|---|
| AI | $\left(\frac{1}{2}q_\alpha + 1, \frac{\sqrt{3}}{2}q_\beta\right)$ | $\left(\frac{1}{2}(q_\alpha + 1), \frac{\sqrt{3}}{2}(q_\beta + 1)\right)$ | $\left(\frac{1}{2}q_\alpha, \frac{\sqrt{3}}{2}q_\beta\right)$ |
| AII | $\left(\frac{1}{2}(q_\alpha + 1), \frac{\sqrt{3}}{2}(q_\beta + 1)\right)$ | $\left(\frac{1}{2}(q_\alpha - 1), \frac{\sqrt{3}}{2}(q_\beta + 1)\right)$ | $\left(\frac{1}{2}q_\alpha, \frac{\sqrt{3}}{2}q_\beta\right)$ |

TABLE II-continued

| | $v_1$ | $v_2$ | $v_3$ |
|---|---|---|---|
| BI | $\left(\frac{1}{2}(q_\alpha+1), \frac{\sqrt{3}}{2}q_\beta\right)$ | $\left(\frac{1}{2}q_\alpha, \frac{\sqrt{3}}{2}(q_\beta+1)\right)$ | $\left(\frac{1}{2}(q_\alpha-1), \frac{\sqrt{3}}{2}q_\beta\right)$ |
| BII | $\left(\frac{1}{2}(q_\alpha+2), \frac{\sqrt{3}}{2}(q_\beta+1)\right)$ | $\left(\frac{1}{2}q_\alpha, \frac{\sqrt{3}}{2}(q_\beta+1)\right)$ | $\left(\frac{1}{2}(q_\alpha+1), \frac{\sqrt{3}}{2}q_\beta\right)$ |

After obtaining the coordinates of the NTVs, the switching states of cascaded H-bridge inverter can be obtained by selecting zero-sequence components and conducting coordinate transformation.

There is no iterative algorithm in all the above calculation processes, so the computation is independent of the level number and the modulation index.

4) According to the principle of volt-second balance, the reference vector $V_{ref}$ in FIG. 3 can be expressed as $$V_{ref} = d_1 OQ + d_2 OR + (1-d_1-d_2)OP \quad (8)$$

Where, $d_1$ represents the duty cycle of vector OQ; $d_2$ represents the duty cycle of vector OR.

By considering the relationship of vectors positions in the FIG. 3, Eq. (8) can be modified as $$\begin{aligned} V_{ref} &= OP + d_1(OQ-OP) + d_2(OR-OP) \\ &= OP + d_1 PQ + d_2 PR \end{aligned} \quad (9)$$

The equivalence between the duty cycles of the NTVs and the duty cycles of the additional vector in the corresponding triangle is obtained by Eq. (3) and Eq. (9), and then the duty cycles of the additional vector PS in the corresponding triangle is solved. Therefore, when the reference vector is located in AI area or BI area, the duty cycles of the NTVs are obtained by the following formula:

$$\begin{cases} d_1 = v_{s\alpha} - \dfrac{v_{s\beta}}{\sqrt{3}} + k_{rec} \\ d_2 = \dfrac{2}{\sqrt{3}} v_{s\beta} \\ d_3 = 1 - d_1 - d_2 \end{cases} \quad (10)$$

Where, $d_1$, $d_2$ and $d_3$ represent the duty cycles of $v_1$, $v_2$ and $v_3$, respectively.

When the reference vector is located in AII area or BII area, the duty cycles of the NTVs are obtained by the following formula:

$$\begin{cases} d_1 = v_{s\alpha} + \dfrac{v_{s\beta}}{\sqrt{3}} \\ d_2 = \dfrac{v_{s\beta}}{\sqrt{3}} - v_{s\alpha} \\ d_3 = 1 - d_1 - d_2 \end{cases} \quad (11)$$

Since above method only involves algebraic calculations, without complex trigonometric operation and sector judgment, the amount of computation is greatly reduced.

In order to verify the feasibility of the proposed SVPWM algorithm, the simulation is carried out on the MATLAB/Simulink platform. In the simulation, the sampling frequency is 2.5 kHz, and the impedance of resistive and inductive load is 10Ω. When the modulation index is 0.9, the simulation waveforms of line voltage VAB under different number of H-bridge cells are shown in FIG. 4. As the number of H-bridge cells increase from 1 to 4, the level number rises from three-level to nine-level. Moreover, the DC voltage required for each H-bridge cell decreases significantly, which is 200 V, 100 V, 66 V and 50 V, respectively. The proposed method is applicable to any level and modulation index. Even if the level number is large, it still has good effect and universality.

What is claimed is:

1. A space vector pulse width modulation (SVPWM) method for an any level cascaded H-bridge inverter, the method comprising:
   1) Voltage vectors generated by the cascaded H-bridge inverter used to synthesize a multilevel space vector diagram in a Cartesian coordinates, in which multiple triangles are formed by connecting the adjacent voltage vectors, and a reference vector is located in the multilevel space vector diagram; wherein: the method also includes the following steps:
   2) The multilevel space vector diagram in the Cartesian coordinates is divided into two types of rectangles, and determines in which type of the rectangles that the reference vector is located in:
   4n+1 horizontal dashed lines are added at equal intervals along the direction of a horizontal axis, wherein the horizontal dashed lines are parallel to the direction of a α-axis and the middle horizontal dashed line coincides with a horizontal axis, and a distance between the horizontal dashed lines, which are adjacent to each other, is √3/2 times of a unit length; and 8n−1 vertical dashed lines are added at equal intervals along the direction of the vertical axis, wherein the vertical dashed lines are parallel to the direction of a β-axis and the middle vertical dashed line coincides with the vertical axis, and a distance between the vertical dashed lines, which are adjacent to each other, is 0.5 times of the unit length; where, n is a number of H-bridge cells in each phase; and the unit length is a distance from an origin to a coordinates (1,0) or a coordinates (0,1) in the Cartesian coordinates; and
   the multilevel space vector diagram is divided into the several rectangles by the horizontal dashed lines and the vertical dashed lines, wherein there are two of the voltage vectors at a vertex of each of the rectangles and the line between these two of the voltage vectors forms a diagonal of the rectangle, and the rectangles are divided into the two types of the rectangles according to the different diagonals of the rectangles: the rectangle is regarded as a type A rectangle when the angle between the diagonal and the α-axis is 60 degrees; the rectangle is regarded as a type B rectangle when the angle between the diagonal and the α-axis is 120 degrees; and then, judges the reference vector is located in the type A rectangle or the type B rectangle according to a boundary of the rectangles;

3) The rectangles are further divided according to the diagonals, an area above a diagonal of the rectangle is regarded as a type I area, and an area below a diagonal of the rectangle is regarded as a type II area, then, judges whether the reference vector is located in the type I area or the type II area, and according to the types of the rectangles and the types of the areas, the position of the reference vector is divided into four types of areas: AI, AII, BI and BII;

4) The coordinates of the nearest three vectors (NTVs) in the Cartesian coordinates are obtained according to the position of the reference vector, and switching states of the cascaded H-bridge inverter are obtained by selecting a zero-sequence component and conducting a coordinate transformation;

5) The reference vector is decomposed into an active vector and an additional vector, and duty cycles of the NTVs are obtained according to the additional vector;

6) the desired reference vector is synthesized by the switching states of the cascaded H-bridge inverter and the duty cycles of the NTVs, and the multilevel SVPWM is realized by using the synthesized reference vector.

2. The SVPWM method for the any level cascaded H-bridge inverter according to claim 1, wherein: in the step 2), after dividing the multilevel space vector diagram in the Cartesian coordinates into the two types of the rectangles, the method determines in which type of the rectangles that the reference vector is located in is as follows:

first, a quantization factor ($q_\alpha$) of the α-axis and a quantization factor ($q_\beta$) of the β-axis are calculated by the following formula:

$$\begin{cases} q_\alpha = \text{floor}(V_{ref\alpha}/0.5) \\ q_\beta = \text{floor}\left(V_{ref\beta} \Big/ \frac{\sqrt{3}}{2}\right) \end{cases} \quad (1)$$

where, $V_{ref\alpha}$ and $V_{ref\beta}$ are components of the α-axis and the β-axis of the reference vector in the Cartesian coordinates, respectively; and floor(•) represents a downward rounding function;

then, judges whether the reference vector is located in the type A rectangle or the type B rectangle by using the following formula:

$$k_{rec} = \begin{cases} 0, & \text{when } q_\alpha + q_\beta \text{ is even} \\ 1, & \text{when } q_\alpha + q_\beta \text{ is odd} \end{cases} \quad (2)$$

where, $k_{rec}$ represents a judgement coefficient of the rectangles; when $k_{rec}$ equals 0, the reference vector is in the type A rectangle; and when $k_{rec}$ equals 1, the reference vector is in the type B rectangle.

3. The SVPWM method for the any level cascaded H-bridge inverter according to claim 1, wherein: in the step 3), the method determines which type of the areas that the reference vector is located in is as follows:

the reference vector is decomposed into the synthesis of the active vector and the additional vector, wherein the additional vector is expressed as:

$$\begin{cases} v_{s\alpha} = V_{ref\alpha} - \frac{1}{2}(q_\alpha + k_{rec}) \\ v_{s\beta} = V_{ref\beta} - \frac{\sqrt{3}}{2}q_\beta \end{cases} \quad (3)$$

where, $v_{s\alpha}$ and $v_{s\beta}$ are components of the α-axis and the β-axis of the additional vector in the Cartesian coordinates, respectively;

then, judges whether the reference vector is located in the type I area or the type II area by using the following formula:

$$k_{reg} = (-1)^{k_{rec}}\sqrt{3}\,v_{s\alpha} - v_{s\beta} \quad (4)$$

where, $k_{reg}$ represents a judgement coefficient of the areas; when $k_{reg}$ is greater than 0, the reference vector is in the type I area; when $k_{reg}$ is less than 0, the reference vector is in the type II area; and when $k_{reg}$ is equal to 0, the reference vector is at a boundary of the type I area and the type II area, which is arbitrarily determined as the type I area or the type II area.

4. The SVPWM method for the any level cascaded H-bridge inverter according to claim 1, wherein: in the step 4), the coordinates of the NTVs in the Cartesian coordinates are obtained according to the position of the reference vector according to the correspondence in the following table:

|  | $v_1$ | $v_2$ | $v_3$ |
|---|---|---|---|
| AI | $\left(\frac{1}{2}q_\alpha + 1, \frac{\sqrt{3}}{2}q_\beta\right)$ | $\left(\frac{1}{2}(q_\alpha + 1), \frac{\sqrt{3}}{2}(q_\beta + 1)\right)$ | $\left(\frac{1}{2}q_\alpha, \frac{\sqrt{3}}{2}q_\beta\right)$ |
| AII | $\left(\frac{1}{2}(q_\alpha + 1), \frac{\sqrt{3}}{2}(q_\beta + 1)\right)$ | $\left(\frac{1}{2}(q_\alpha - 1), \frac{\sqrt{3}}{2}(q_\beta + 1)\right)$ | $\left(\frac{1}{2}q_\alpha, \frac{\sqrt{3}}{2}q_\beta\right)$ |

|  | $v_1$ | $v_2$ | $v_3$ |
|---|---|---|---|
| BI | $\left(\frac{1}{2}(q_\alpha+1), \frac{\sqrt{3}}{2}q_\beta\right)$ | $\left(\frac{1}{2}q_\alpha, \frac{\sqrt{3}}{2}(q_\beta+1)\right)$ | $\left(\frac{1}{2}(q_\alpha-1), \frac{\sqrt{3}}{2}q_\beta\right)$ |
| BII | $\left(\frac{1}{2}(q_\alpha+2), \frac{\sqrt{3}}{2}(q_\beta+1)\right)$ | $\left(\frac{1}{2}q_\alpha, \frac{\sqrt{3}}{2}(q_\beta+1)\right)$ | $\left(\frac{1}{2}(q_\alpha+1), \frac{\sqrt{3}}{2}q_\beta\right)$ | where, $v_1$, $v_2$ and $v_3$ represent the NTVs, $q_\alpha$ is a quantization factor of the α-axis, and $q_\beta$ is a quantization factor of the β-axis.

5. The SVPWM method for the any level cascaded H-bridge inverter according to claim 1, wherein that: in the step 5), the duty cycles of the NTVs are obtained of the reference vector in different positions as follow:

when the reference vector is located in the AI area or the BI area, the duty cycles of the NTVs are obtained by the following formula:

$$\begin{cases} d_1 = v_{s\alpha} - \frac{v_{s\beta}}{\sqrt{3}} + k_{rec} \\ d_2 = \frac{2}{\sqrt{3}} v_{s\beta} \\ d_3 = 1 - d_1 - d_2 \end{cases} \quad (5)$$

when the reference vector is located in the AII area or the BII area, the duty cycles of the NTVs are obtained by the following formula:

$$\begin{cases} d_1 = v_{s\alpha} + \frac{v_{s\beta}}{\sqrt{3}} \\ d_2 = \frac{v_{s\beta}}{\sqrt{3}} - v_{s\alpha} \\ d_3 = 1 - d_1 - d_2 \end{cases} \quad (6)$$

where, $d_1$, $d_2$ and $d_3$ represent the duty cycles of $v_1$, $v_2$ and $v_3$, respectively, $k_{rec}$ represents a judgement coefficient of the rectangles, $v_{s\alpha}$ and $v_{s\beta}$ are components of the α-axis and the β-axis of the additional vector in the Cartesian coordinates, respectively.

* * * * *